(12) United States Patent
Wada (10) Patent No.: US 6,274,996 B1
(45) Date of Patent: *Aug. 14, 2001

(54) DRIVE CONTROL METHOD FOR STEPPING MOTOR

(75) Inventor: Yasuhiro Wada, Osaka (JP)

(73) Assignee: Funai Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,671

(22) Filed: May 11, 1999

(30) Foreign Application Priority Data

May 11, 1998 (JP) .................................. 10-126966

(51) Int. Cl.$^7$ ........................................................ H02P 8/22
(52) U.S. Cl. ............................................................. 318/696
(58) Field of Search ..................................... 318/685, 696

(56) References Cited

U.S. PATENT DOCUMENTS

| | | | |
|---|---|---|---|
| 3,972,535 | * 8/1976 | Bleiman | 369/266 |
| 4,476,421 | 10/1984 | Moriguchi | 318/696 |
| 4,490,664 | 12/1984 | Moriguchi | 318/696 |
| 4,536,691 | * 8/1985 | Sakakibara | 318/696 |
| 4,757,246 | * 7/1988 | Komuro | 318/696 |
| 5,089,902 | * 2/1992 | Tsubota | 358/497 |
| 6,016,044 | * 1/2000 | Holdaway | 318/696 |

FOREIGN PATENT DOCUMENTS

| | | |
|---|---|---|
| 60-105159 | 7/1985 | (JP) . |
| 5-278293 | 10/1993 | (JP) . |

* cited by examiner

*Primary Examiner*—Bentsu Ro
(74) *Attorney, Agent, or Firm*—Lackenbach Siegel Marzullo Aronson & Greenspan, P.C.

(57) ABSTRACT

A drive control apparatus for a stepping motor comprises a driving circuit connected to the stepping motor for driving the same, and a controller for outputting a control signal to the driving circuit so as to set up a W1-2 phase driving mode when the stepping motor is in an acceleration and deceleration states, and so as to set up 1-2 phase driving mode when the stepping motor is in a constant-speed state.

5 Claims, 7 Drawing Sheets

DRIVE CONTROL METHOD FOR STEPPING MOTOR

BACKGROUND OF THE INVENTION

This invention relates to a drive control method for a stepping motor used for driving a printing head, and more particularly a drive control method for a stepping motor driver of the slow-decay type.

There is proposed a method for driving and controlling a printing head of a printer by use of a slow-decay type of a stepping motor.

A drive circuit for the stepping motor is of the bipolar type in which to efficiently use the coils, each motor phase is operated by use of a bridge circuit and the polarity of the motor phase is alternately inverted by flowing bipolar current thereto.

Figure 8:
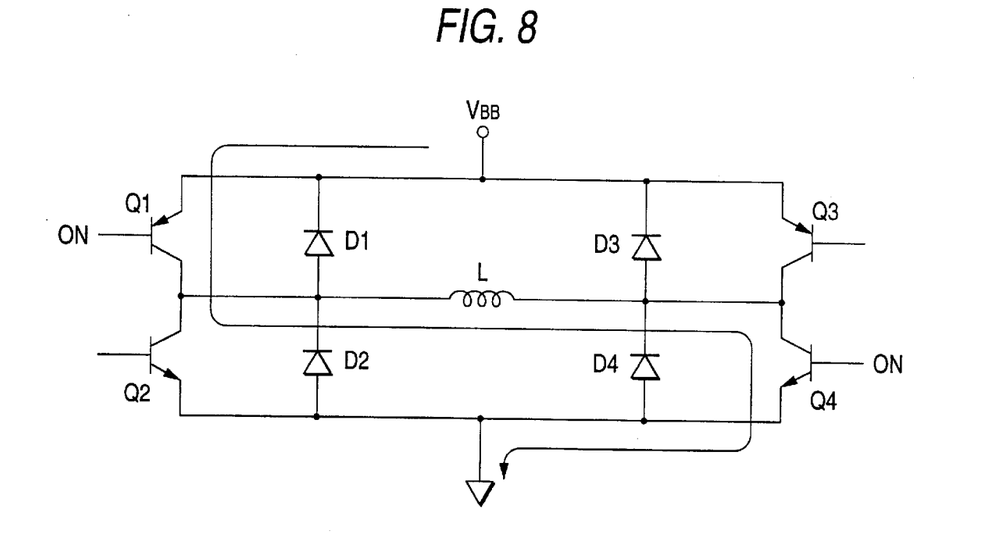
FIG. 8 is a drive circuit for driving a slow-decay type of a stepping motor when a chopping mode is set up.
Figure 9:
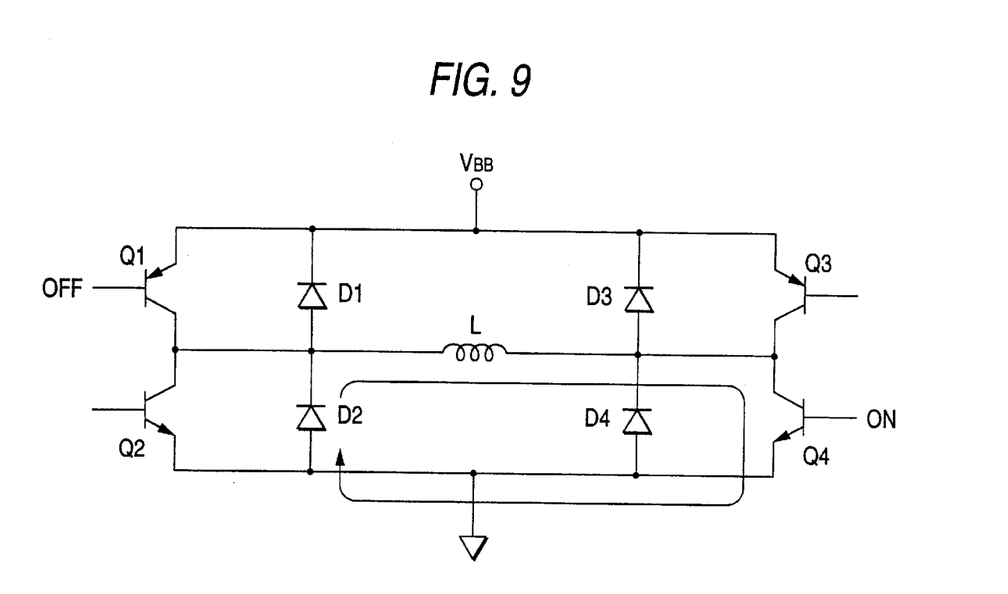
FIG. 9 is a drive circuit for driving a slow-decay type of a stepping motor when a chopping mode is removed.

FIGS. 8 and 9 show a drive circuit for driving a slow-decay type of a stepping motor. As shown, a bridge circuit is formed by use of four diodes D1 to D4. Switching transistors Q1 to Q4 are coupled across those diodes, respectively. To set up a chopping mode in the bridge circuit, switching transistors Q1 and Q4 are turned on, and current flows through a current path including a coil L (FIG. 8). To remove the chopping mode, the switching transistor Q4 remains on, and the switching transistor Q1 is turned off. As a result, current supply to the coil L is stopped. At this time, the coil L generates an electromotive force because of electromagnetic nature thereof, so that current flows through the coil L, the switching transistor Q4, and the diode D2 in this order (FIG. 9). As a result, the current flowing through the coil L is gradually attenuated. The same thing is true for a case where the coil L is energized by the transistors Q2 and Q3.

Figure 7:
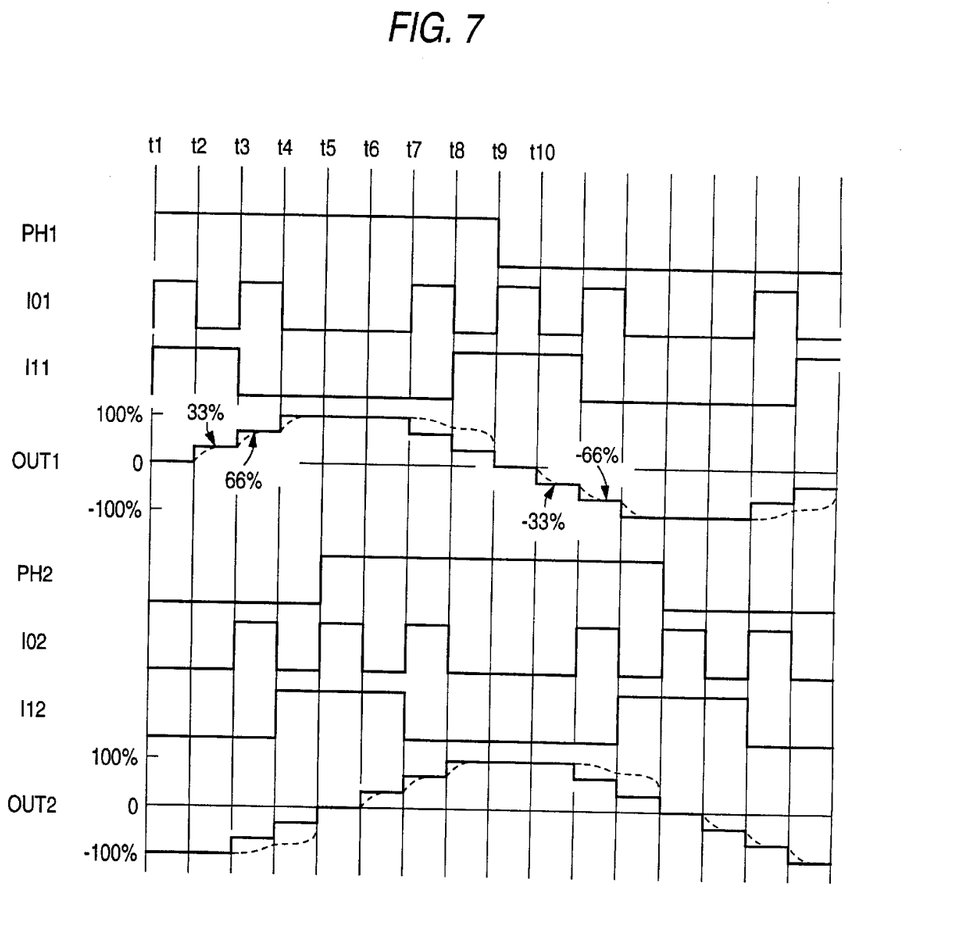
FIG. 7 is a timing chart showing a W1-2 phase driving used for driving a stepping motor.

The conventional drive circuit for the stepping motor of the slow-decay type uses a W1-2 phase driving method (as shown in FIG. 7) for the motor speed control in all acceleration, constant-speed and deceleration states or conditions.

In FIG. 7, a signal PH1 is a signal indicative of a polarity of current flowing through a first phase coil; signals I01 and I11 are step pulses for controlling the current flowing through the first phase coil; a signal OUT1 is a current output to the first phase coil; a signal PH2 is a signal indicative of a polarity of current flowing through the second phase coil; signals I01 and I12 are step pulses for controlling the current flowing through the second phase coil; and a signal OUT2 is a current output to the second phase coil. The current waveforms indicated by solid lines shown in OUT1 and OUT2 in FIG. 7 are logic waveforms, and their actual waveforms are as indicated by dashed lines.

The waveform of the current signal OUT1 is configured in four steps by combinations of signal states "H" and "L" of two step pulse signals I01 and I11. Namely, when both of I01 and I11 are "H", OUT1 becomes 0%. When I01 is "L" and I11 is "H", it becomes 33% (or −33%). When I01 is "H" and I11 is "L", it becomes 66% (or −66%). When both of I01 and I11 becomes "L", it becomes 100%. The above combination relationships are correspondingly applied to the combination relationships between the current signal OUT2 flowing into the second phase and the two pulse signals I01 and I02 for controlling it.

As seen from the above description, in the W1-2 phase driving method, when current is supplied to the first phase coil, the output current signal OUT1 is gradually increased (in four steps) up to 100% (or −100%). When current supply to the first phase coil is stopped, the output current signal OUT1 is gradually decreased (in four steps) up to 0%.

More specifically, during a time period from a time point t1 (at which current supply to the first phase coil starts) to a time point t2, the pulse signal I01 is set at "H" and the pulse signal I11 is set at "H", and the output current signal OUT1 is 0%. During the succeeding time period from t2 to t3, the pulse signal I01 is "L" and the pulse signal I11 is "H", and the output current signal OUT1 is 33%. During the succeeding time period from t3 to t4, the pulse signal I01 is "H" and the pulse signal I11 is "L", and the output current signal OUT1 is 66%. During the succeeding time period from t5 to t6, the pulse signal I01 is "L" and the pulse signal I11 is "L", and hence the output current signal OUT1 is 100%. Thus, the output current signal OUT1 is gradually increased from 0% to 100% during a time period from t1 to t4.

During a time period from time points t4 to t7, the output current signal OUT1 is kept at 100%. During a time period from t7 to t8, the pulse signal I01 is "H" and the pulse signal I11 is "L", and then the output current signal OUT1 is 66%. During a time period from t8 to t9, the pulse signal I01 is "L" and the pulse signal I11 is "H", and hence the output current signal OUT1 is 33%. During a time period from t9 to t10, the pulse signal I01 is "L" and the pulse signal I11 is "L", so that the output current signal OUT1 is 0%. Thus, during a time period from t7 to t10, the output current signal OUT1 is gradually decreased from 100% to 0%.

Similarly, when current is also fed to the second phase coil, the output current signal OUT2 is gradually increased (in four steps) to 100% (or −100%). Also when current feeding to the second phase coil is stopped, the output current signal OUT2 is gradually decreased (in four steps) to 0%.

In case where the W1-2 phase driving method is used for the speed control of the printing head, drive sound and vibrations are diminished in particular when the printing head is accelerated (driven to start its movement) and decelerated (stopped).

In case where the W1-2 phase driving mode is performed in the constant-speed state where the printing is carried out by the printing head, the current control fails when the drive circuit for the slow-decay type stepping motor is operated in a microstep driving mode, in particular when the current is attenuated. Comparing an actual waveform (depicted by dashed lines) of the output current signal OUT1 (OUT2) with a logic waveform (depicted by solid lines) of the same in their amplitude decreasing portions. As seen from the comparison, the actual waveform more gently decreases its amplitude than the logic waveform, and after a short time, its amplitude abruptly decreases to 0% while the logic waveform stepwise decreases its amplitude. This output current variation will causes printing head vibrations and vertical stripes which appear in the printed picture or print while being spaced at fixed intervals. Those vertical stripes are a little distinguished in normal print; however, those are likely to occur and becomes problematic in high definition print.

To solve the stripe problem, there is a proposal of a drive control method for a stepping motor (referred frequently to as a motor drive control method), disclosed in Unexamined Japanese Patent Publication No. 5-278293. In the motor drive control method, in acceleration and deceleration states or conditions, the motor speed control progresses selectively using the 1-2 phase driving mode and the 2-2 phase driving mode. More precisely, in low speed states, the 1-2 phase driving mode is used which less produces vibrations and noisy sounds (drive sound). In high speed states, the 2-2 phase driving mode is used which requires a small number of motor-drive switching.

The conventional motor drive control method succeeds in suppressing generation of vertical stripes in a satisfactory level in normal print. However, it has still such a problem that a definition of the print is unsatisfactory in high definition print.

SUMMARY OF THE INVENTION

Accordingly, the present invention has been made to solve the above problems, and has an object to provide a drive control method for a stepping motor which improves a definition of the print, and completely suppresses vibrations and drive sounds of the motor by completely eliminating generation of the stripes in the printed picture.

In order to achieve the above object, there is provided a drive control apparatus for a stepping motor comprising: a driving circuit connected to the stepping motor for driving the same; and a controller for outputting a control signal to the driving circuit so as to set up a W1-2 phase driving mode when the stepping motor is in an acceleration and deceleration states, and so as to set up 1-2 phase driving mode when the stepping motor is in a constant-speed state.

It may be configured that: the controller outputs a control signal such that a logical waveform of a current flowing in each phase of the stepping motor stepwise increases when the stepping motor is in a constant-speed state.

In the apparatus, the controller performs the switching between the W1-2 phase driving mode and the 1-2 phase driving mode in a one-phase driving state of the stepping motor.

According to the present invention, there is also adopted a drive control method for a stepping motor comprising the steps of: accelerating the stepping motor under a W1-2 phase driving mode; keeping the speed of the stepping motor under a 1-2 phase driving mode; and decelerating the stepping motor under a W1-2 phase driving mode.

It may be configured that: a logical waveform of a current flowing in each phase of the stepping motor is stepwise increased when the stepping motor is in a constant-speed state.

In the method, the switching between the W1-2 phase driving mode and the 1-2 phase driving mode is performed in a one-phase driving state of the stepping motor.

DETAILED DESCRIPTION OF THE PREFERRED EMBODIMENTS

The preferred embodiments of the present invention will be described with reference to the accompanying drawings.

Figure 1:
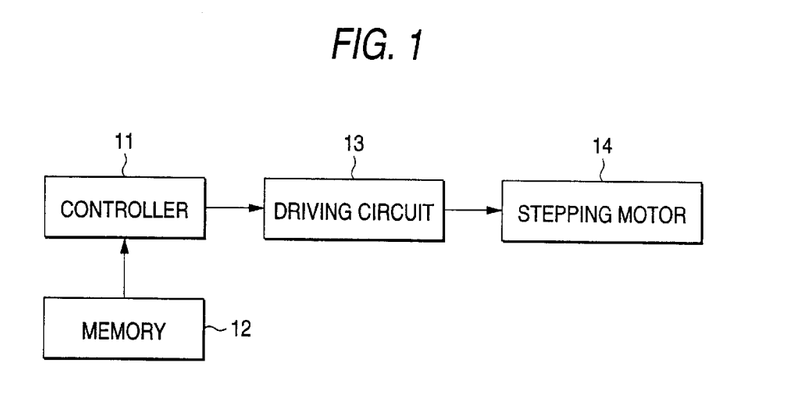
FIG. 1 is a schematic block diagram showing a control system for driving a stepping motor of the slow-decay type.

FIG. 1 is a schematic block diagram showing a control system for driving and controlling a stepping motor of the slow-decay type. As shown, the control system comprises a controller 11, a memory 12, a drive circuit (motor driver) 13, and a stepping motor 14. In the control system, the drive circuit 13 is of the bipolar type in which each motor phase is operated by use of a bridge circuit and the polarity of the motor phase is alternately inverted by flowing bipolar current thereto.

The controller 11 generates a specific control signal and applies it to the drive circuit 13. The control signal is used for selecting one of step pulse signals (I01, I11) and (I02, I12) in accordance with speed control modes for the stepping motor 14, acceleration, constant-speed and deceleration modes. A ramp table on acceleration and deceleration is stored in advance in the memory 12.

Figure 2:
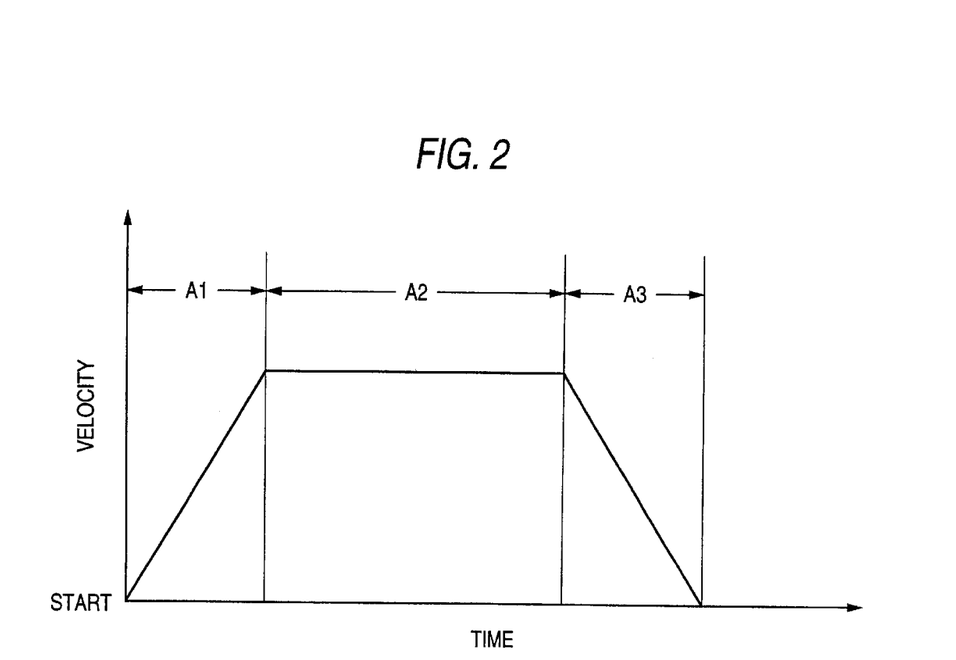
FIG. 2 shows a profile of a variation of drive speed of the stepping motor.

FIG. 2 shows a profile of a variation of drive speed of the stepping motor 14. As shown, the variation curve consists of three states, an acceleration state A1, a constant-speed state A2 and a deceleration state A3. In the acceleration state A1, the motor starts to move the printing head and accelerates it up to a predetermined speed. In the constant-speed state A2, the printing head performs printing operation. In the deceleration state A3, the motor decelerates the printing head having completed the printing and stops the printing head in movement.

A drive control method for the stepping motor 14 according to the present invention, the motor driving mode is selectively used in accordance with the acceleration and deceleration state (A1 and A3) and the constant-speed state A2.

Figure 3:
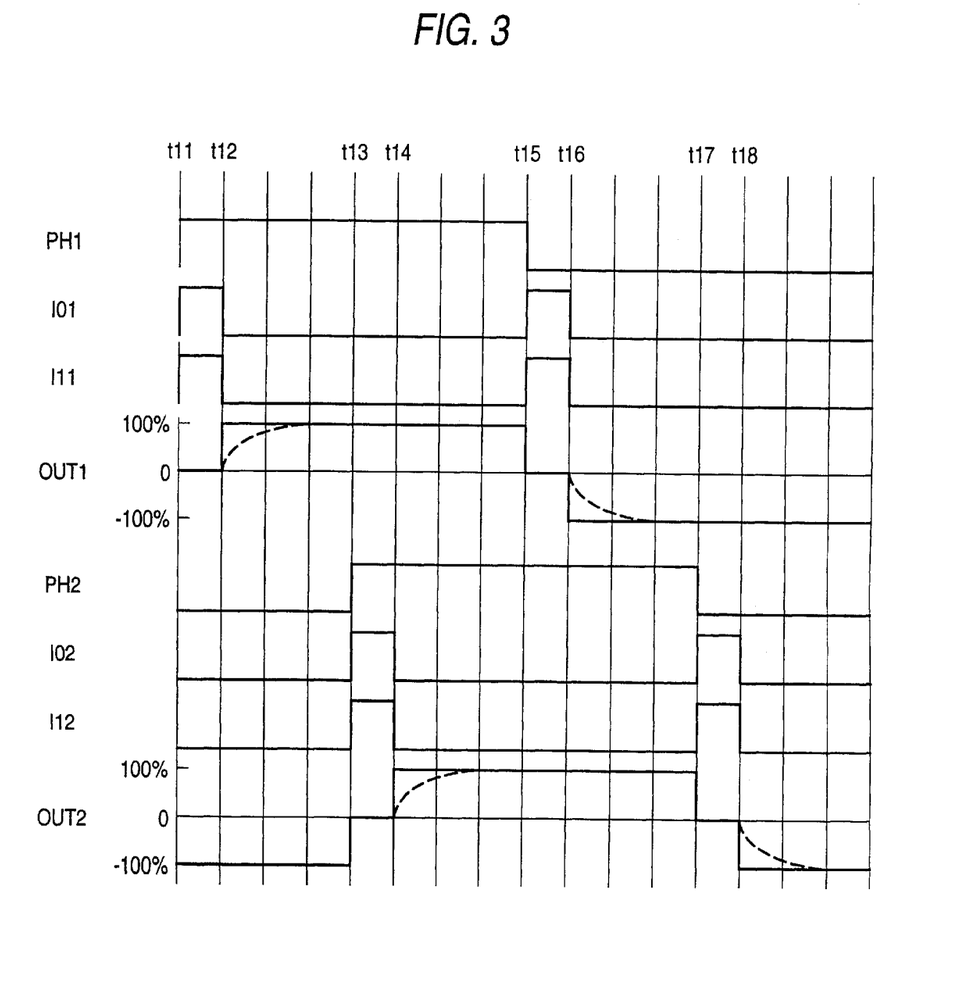
FIG. 3 is a timing chart showing a 1-2 phase driving used in a constant-speed mode of the stepping motor, which is one embodiment of the present invention.

The W1-2 phase driving (FIG. 7) is used in the acceleration and deceleration states, and a 1-2 phase driving shown in FIG. 3 is used in the constant-speed state. The signals shown in FIG. 3 are the same as of the signals in FIG. 7, respectively.

In the 1-2 phase driving mode shown in FIG. 3, when current is fed to the first phase coil, the output current signal OUT1 is increased abruptly from 0% to 100% (or −100%), and when current supply to the first phase coil is stopped, the output current signal OUT1 is decreased abruptly from 100% to 0%.

During a time period up to a time point t12 at which current feeding to the first phase coil starts, the pulse signals I01 and I11 are both "H" in logic state, and the output current signal OUT1 is 0%. At the time point t12, the pulse signals I01 and I11 are both rendered "L" in logic state, and the output current signal is increased to 100%. During a period from t12 to t15, the output current signal is kept at 100%. At t15, the pulse signals I01 and I11 are both switched to "H", and the output current signal is decreased to 0%.

During a time period up to a time point t14 at which current feeding to the second phase coil starts, the pulse signals I02 and I12 are both "H" in logic state, and the output current signal OUT2 is 0%. At the time point t14, the pulse signals I02 and I12 are both rendered "L" in logic state, and the output current signal is increased to 100%. During a period from t14 to t17, the output current signal is kept at 100%. At t17 at which current supply to the second phase coil is stopped, the pulse signals I02 and I12 are both switched to "H", and the output current signal is decreased to 0%.

Thus, the present embodiment uses the 1-2 phase driving method as timed in FIG. 3 in the constant-speed state in which the printing head performs a printing operation. With this technical feature, the control failure problem is solved which arises when the drive circuit for the slow-decay type stepping motor is driven in a microstep mode by performing the W1-2 phase driving mode in the constant-speed state, and the current is attenuated. As a result, high definition print free from vertical stripes is secured by high speed printing of less vibration. Further, in the acceleration and deceleration states, the W1-2 phase driving method is used as in the related art. With this feature, the motor is driven and controlled at low vibration and low noise.

For the output current signals OUT1 and OUT2 in FIG. 3, the logic current waveforms vary as depicted by solid lines, and the actual current waveforms vary as indicated by dashed lines. As seen, the output current signals OUT1 and OUT2 steeply rise from 0% to 100% in their logic waveform. Actually, however, those gently rise as indicated by dashed lines. This fact teaches that the current control is possible during a current increasing state even if the W1-2 phase driving method is used.

Another drive control method for the stepping motor 14 is such that the W1-2 phase driving method (FIG. 7) is used in the acceleration and deceleration states, and the 1-2 phase driving method (FIG. 4) is used in the constant-speed state.

Figure 4:
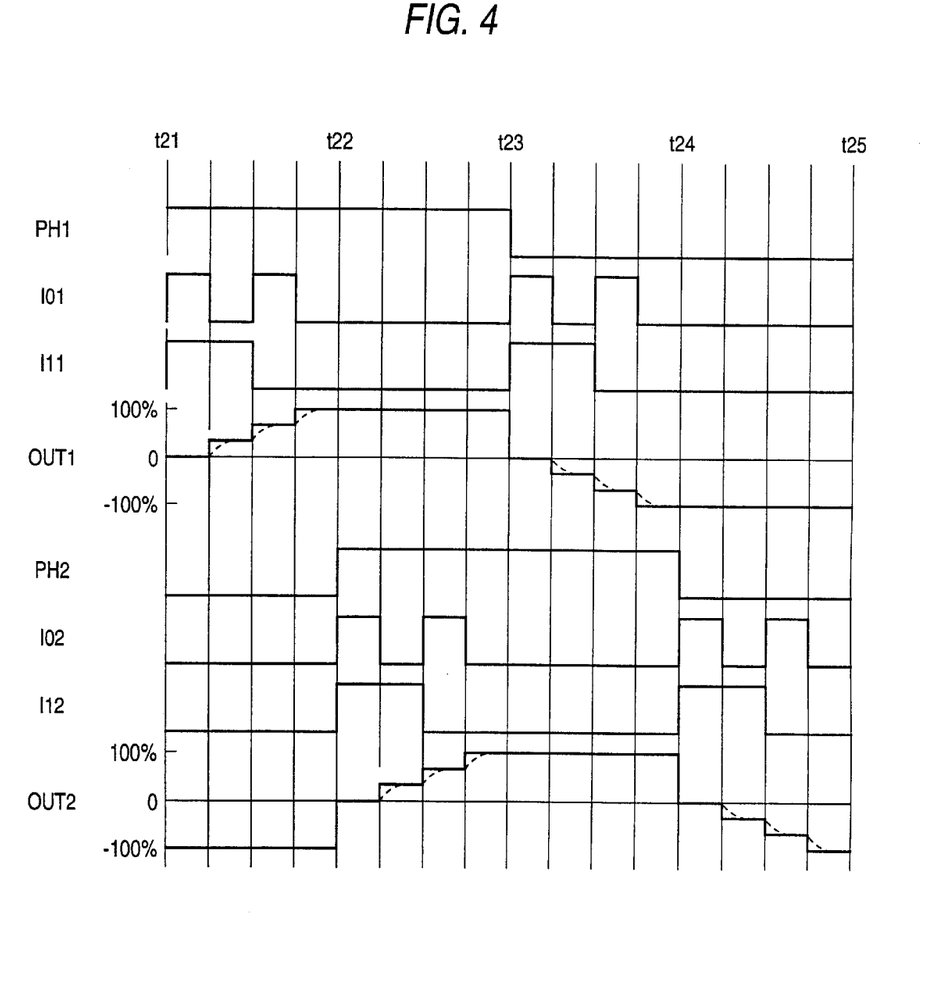
FIG. 4 is another timing chart showing a 1-2 phase driving used in a constant-speed mode of the stepping motor, which is another embodiment of the present invention.

To be more specific, a drive control method (quartered drive control method), which resembles the W1-2 phase driving method, is used in the constant-speed state only when the output current signal OUT1 increases (from t21 to t22, t23 to t24) and the output current signal OUT2 increases (from t22 to t23, t24 to t25). Namely, the current outputs are stepwise increased. Subsequently, the 1-2 phase driving method (FIG. 3) is used for driving the motor. This motor drive control method further provides an enhanced ability of the current control for the stepping motor 14.

Figure 5:
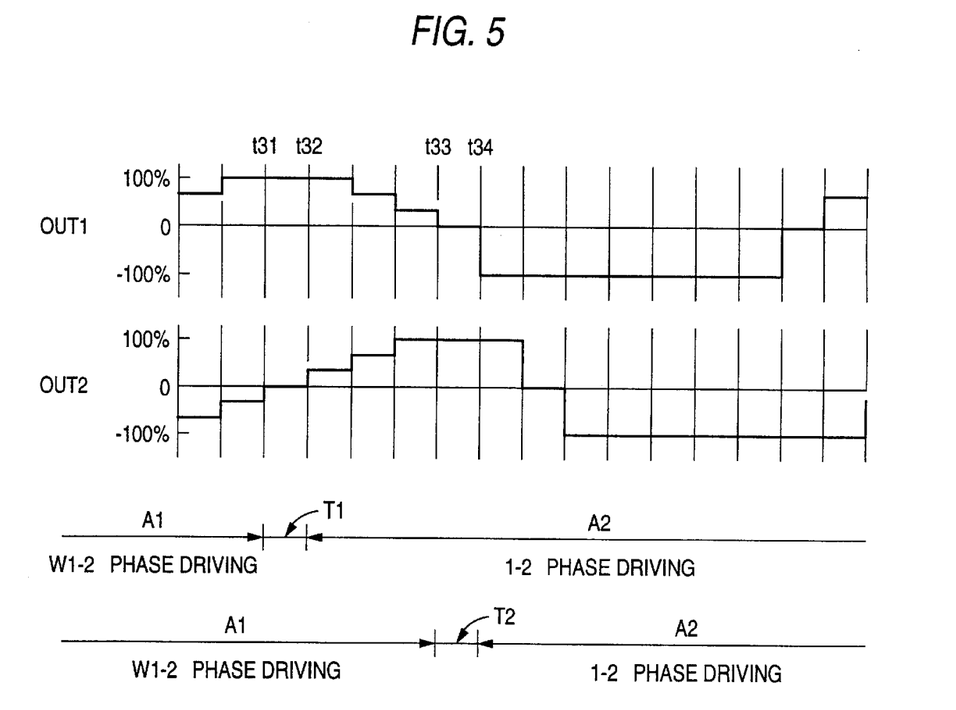
FIG. 5 is a timing chart useful in explaining the timings of switching motor speed control of the stepping motor from an acceleration mode to a constant-speed mode.
Figure 6:
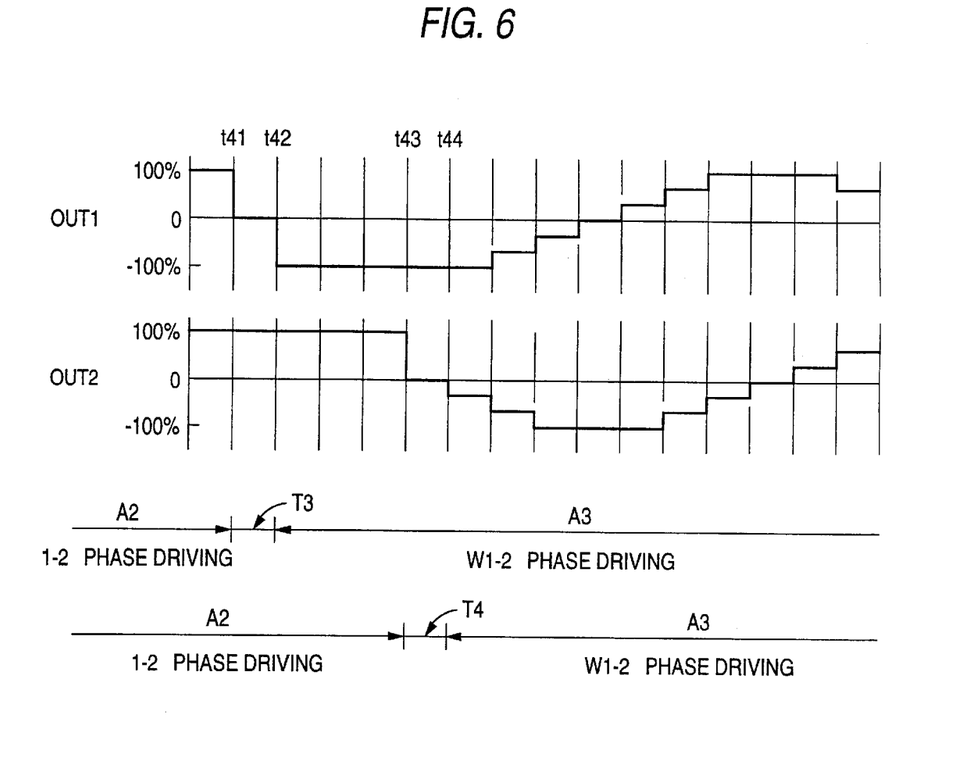
FIG. 6 is a timing chart useful in explaining the timings of switching motor speed control of the stepping motor from an the constant-speed mode to a deceleration mode.

FIG. 5 shows a profile showing timings of switching the speed control phase of the stepping motor 14 from the acceleration state to the constant speed state (viz., from the W1-2 phase driving mode to the 1-2 phase driving mode). FIG. 6 shows a profile showing timings of switching the speed control mode of the stepping motor 14 from the constant-speed state to the deceleration state (viz., from the 1-2 phase driving mode to the W1-2 phase driving mode).

Thus, in the present invention, the driving mode is switched from the W1-2 phase driving mode to the W1-2 phase driving mode in a one-phase driving state. In other words, the 1-2 phase driving mode (FIG. 3) is switched to the W1-2 phase driving method (FIG. 7) at a phase which is common to both the driving modes (a state where the output current signal of one of the first or second phases is 100%, while the other is 0%), in order to make the switching smooth.

More specifically, in the timing chart of FIG. 5, during a time period from a time point t31 to another time point t32 (denoted by T1), the current signal OUT1 output to the first phase coil is 100% while the current signal OUT2 output to the second phase coil is 0%. Further, during another time period from t33 to t34 (denoted by T2), the output current signal OUT1 to the first phase coil is 0% while the output current signal OUT2 to the second phase coil is 100%. Therefore, in this instance, the 1-2 phase driving mode is switched to the W1-2 phase driving mode at either of those time durations.

In the timing chart of FIG. 6, during a time period from a time point t41 to another time point t42 (denoted by T3), the current signal OUT1 output to the first phase coil is 0% while the current signal OUT2 output to the second phase coil is 100%. Further, during another time period from t43 to t44 (denoted by T4), the output current signal OUT1 to the first phase coil is 100% while the output current signal OUT2 to the second phase coil is 0%. Also in this instance, the 1-2 phase driving mode is switched to the W1-2 phase driving mode at either of those time durations.

In the above-mentioned embodiment, the drive circuit 13 for the driving of the stepping motor 14 is of the bipolar type. If required, it may be of the unipolar type.

As has been described heretofore, since a driving mode is switched such that a W1-2 phase driving mode is set up when the speed control for the stepping motor is in acceleration and deceleration states, and a 1-2 phase driving mode is set up when it is in a constant-speed state, the drive control method substantially eliminates the control failure which arises when the drive circuit for the slow-decay type stepping motor is operated in a microstep driving mode and the current is attenuated. High definition print can be secured through less-vibration printing (causing no vertical stripes). The resultant print is good in tone expression and clear. Further, the W1-2 phase driving mode is performed in the constant-speed state to provide a motor driving at low vibration and low noise.

Further, since a speed control mode, which resembles the W1-2 phase driving mode, is set up only when current fed to each phase coil is increasing in the constant-speed state, and the 1-2 phase driving mode is set up in the subsequent constant-current and current decreasing state. This motor drive control method further provides an enhanced ability of the current control for the stepping motor. High definition print can be secured through less-vibration printing (causing no vertical stripes). The resultant print is good in tone expression and clear.

Still further, since the switching from the W1-2 phase driving mode to the 1-2 phase driving mode is performed in a one-phase driving state. Thus, the 1-2 phase driving mode is switched to the W1-2 phase driving method at a state which is common to both the driving modes. Therefore, the switching operation can be made smooth.

What is claimed is:

1. A drive control apparatus for a stepping motor provided with two exciting coils, comprising:

a driving circuit for outputting current signals to the respective exciting coils to drive the stepping motor; and a controller for outputting a control signal to the driving circuit to set up a 1-2 phase driving mode in which a one-phase excitation and a first two-phase excitation of the exciting coils are alternately performed, when the stepping motor is in a constant-speed state, and to set up a W1-2 phase driving mode in which the one-phase excitation and a second two-phase excitation of exciting coils are alternately performed, when the stepping motor is in acceleration and deceleration states, wherein the one-phase excitation is an excitation aspect in which one exciting coil is excited by the current signal having a maximum absolute value thereof, and no current signal is supplied to the other excitation coil;

wherein the first two-phase excitation is an excitation aspect in which two exciting coils are excited by the current signals, each having the maximum absolute value thereof; and wherein the second two-phase excitation is an excitation aspect in which two exciting coils are excited by the current signals such that a sum of the absolute values of the respective current signals is a constant value which is smaller than a sum of the absolute values of the respective current signals in the first two-phase excitation.

2. The drive control apparatus as defined in claim 1, wherein in a case where the maximum absolute value of the current signal is defined as 100, the constant value is substantially 133.

3. The drive control apparatus as defined in claim 1, wherein the controller outputs a control signal to the driving circuit to set up a 1-2 phase driving mode in which a one-phase excitation and a third two-phase excitation of exciting coils are alternately performed, when the stepping motor is in a constant-speed state; and wherein the third two-phase excitation is an excitation aspect in which two exciting coils are excited by the current signals such that a sum of absolute values of the respective current signals is increased toward a sum of absolute values of the respective current signals in the first two-phase excitation.

4. The drive control apparatus as defined in claim 3, wherein in a case where the maximum value of the current signal is defined as 100, the sum of absolute values of the respective current signals is increased stepwise from 100 to 200 via 133 and 166.

5. The drive control apparatus as defined in claim 1, wherein the controller performs switching between the 1-2 phase driving mode and the W1-2 phase driving mode when the one-phase excitation is performed.

* * * * *